United States Patent
Chapman

(10) Patent No.: US 12,554,025 B2
(45) Date of Patent: *Feb. 17, 2026

(54) COMPENSATED DUAL ELEMENT DETECTOR FOR MEASURING THE DISTANCE TO A RADIO-LABELLED SOURCE

(71) Applicant: Actis IP Holdings, LLC, Powell, OH (US)

(72) Inventor: Gregg J. Chapman, Plain City, OH (US)

(73) Assignee: Actis IP Holdings, LLC, Powell, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,705

(22) Filed: Jan. 14, 2021

(65) Prior Publication Data
US 2024/0219584 A1 Jul. 4, 2024

Related U.S. Application Data

(60) Provisional application No. 62/962,232, filed on Jan. 17, 2020.

(51) Int. Cl.
*G01T 1/17* (2006.01)

(52) U.S. Cl.
CPC ..................... *G01T 1/17* (2013.01)

(58) Field of Classification Search
CPC .. G06Q 50/265; G06Q 50/01; G06Q 10/1093; G06N 20/00; G06N 5/04; H04L 67/53; H04L 67/535; A61B 6/5294; G01D 5/48; G01T 1/1603; G01T 1/202; G01T 1/24; G06F 9/54; G06F 21/604; G06F 21/62; G09B 19/00

See application file for complete search history.

(56) References Cited

U.S. PATENT DOCUMENTS

| | | | | |
|---|---|---|---|---|
| 4,889,991 A | * | 12/1989 | Ramsey | G01T 1/161 250/363.01 |
| 6,144,876 A | * | 11/2000 | Bouton | A61B 6/4258 600/436 |
| 6,236,880 B1 | * | 5/2001 | Raylman | G01T 1/161 600/436 |
| 2004/0037394 A1 | * | 2/2004 | Kuroda | G01T 1/2907 378/205 |

* cited by examiner

*Primary Examiner* — David J Makiya
*Assistant Examiner* — Fani Polyzos Boosalis
(74) *Attorney, Agent, or Firm* — Emerson, Thomson & Bennett, LLC; Roger D. Emerson; Peter R. Detorre

(57) ABSTRACT

An instrument and software methodology to detect a radioactive source and incorporates the following:
1) two radiation detectors in a co-axial configuration, housed in a handheld probe, and
2) a gamma detection control unit executing software algorithms to limit the functional field of view to the front aspect of the probe, vary the depth and width of the field of view to provide collimation without the use of metallic shielding, and allowing the instrument to measure the distance to the radiation source. Due to the shielding effect that the forward detector has on the rear detector, several mathematical factors must be applied to the basic equations utilized for a front/rear detector system, as is disclosed herein.

9 Claims, 2 Drawing Sheets

COMPENSATED DUAL ELEMENT DETECTOR FOR MEASURING THE DISTANCE TO A RADIO-LABELLED SOURCE

CROSS-REFERENCE TO RELATED APPLICATIONS

This application claims benefit of provisional 62/962,232 filed Jan. 17, 2020, is cross-referenced to U.S. Ser. No. 17/148,716 filed Jan. 14, 2021 (provisional 62/962,234 filed Jan. 17, 2020, entitled "Electronic Collimation and Depth Detection in a Side-Viewing Laparoscopic Probe for the Detection of High Energy Gamma Radiation"), now U.S. Pat. No. 12,213,822 and U.S. Ser. No. 17/148,724 filed Jan. 14 2021 (provisional 62/962,235 filed Jan. 17, 2020, entitled "Hybrid Collimation to Limit Field of View for Gamma Detection Probes at High and Low Energies"), now U.S. Pat. No. 11,562,454.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

Gamma-Guided Surgery has become a standard of care for localization of many forms of cancerous tissues in surgical oncology. Most gamma detection probes, such as a probe, 10, shown in FIG. 1, incorporate a single detector, 12, to measure the count rate of gamma radiation source, 34, (see FIG. 4) within the field of view, 14, of the probe. Field of view 14 is limited by heavy metal side, 16*a* and 16*b*, and rear shielding, 18, either tungsten or lead, to give gamma detection probe 10 directionality (See FIG. 1). This method of collimation requires detector 12 to be recessed, typically around 10.46 mm, within the shielding to reduce the angle of the field of view. This practice significantly reduces the sensitivity of the probe. Moreover, the thickness of the shielding, and size of the probe, must be increased when the intended application for the probe includes radionuclides of higher energy. This fact has led to the design of commercially available probes, intended to detect 511 KeV, which are far too large in diameter to be introduced into the surgical field laparoscopically or in a robotic surgical approach.

Previous patents describe the use of multiple detector elements to limit the probe field of view without the use of heavy metal shielding. This electronic collimation compares the count rate of two or more detectors and applies a mathematical calculation based on the Inverse Squared Law to define the field of view. Probe counting is inhibited whenever the source is not within the calculated field of view. See U.S. Ser. No. 16/904,126. See also Chapman, G. J. (2017). "*High Energy Gamma Detection for Minimally Invasive Surgery*", (Doctoral dissertation), The Ohio State University, Columbus, OH, ProQuest Dissertations Publishing, 2019, 27539296.

The present disclosure is addressed to an improved electronic collimated probe for radiation detection.

BRIEF SUMMARY OF INVENTION

The present invention describes a gamma detection system, which includes a hand-held probe and central controller containing software algorithms specific to the application. This design implements a collimated field of view without the use of heavy metal shielding, and detects the depth of a radiation source embedded in tissue or other medium. The invention is differentiated from prior art in that only two detectors are required to implement a field of view on the frontal aspect of the hand-held probe. Moreover, the methodology relies on the separation of the two detectors both located along a longitudinal extent of the probe, as opposed to differences in sensitivity due to the shielding effect of surrounding material or additional detectors. Because the preferred geometry of the invention aligns two gamma radiation detectors on the long axis of the hand-held probe, the diameter of the applied part can be reduced to less than 12 millimeters. Because the front detector is not recessed in heavy metal shielding, the distance from the detector to the source is reduced, increasing the sensitivity of the probe. The two-detector probe without shielding, its use in detecting gamma rays, and the resulting system are disclosed herein.

Due to the shielding effect that the forward detector has on the rear detector, several mathematical factors must be applied to the basic equations utilized for a front/rear detector system, as is disclosed herein. Those factors will be described in detail below.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION OF THE INVENTION

Detectors

The distance to the radiation source for inventive probe 20 is determined by comparing the difference in gamma count rates received by two semiconductor or scintillation crystals, 22 and 24, separated by a known distance. Such scintillation crystals can be around 5 mm×5 mm×5 mm. For probe 20 in FIG. 2, crystals 22 and 24 are separated by a spacer, 26, (for example, 12 mm diameter and 5 mm thickness) such as polytetrafluorine (TEFLON®, whose thickness in the crystals separation distance. Also shown is a pre-amplifier bracket, 28, and pre-amplifier(s), 30. All components are housed within an elongate annular housing, 32, desirably made of stainless steel. If the radiation counts received all originated from a small source at a distance greater than the diameter of the probe, the Inverse Squared Law for point source radiation can be applied to mathematically to estimate the distance from the forward (distal) detector and the radiation source. The Inverse Squared Law is most commonly expressed as:

$$N_F = S * \frac{A\epsilon_{ip}}{4\pi d^2}$$

where,
$N_F$ is the number of gamma counts received;
S is the gamma source activity in Becquerels (emissions per second);
A, is the area of the detector;
$\epsilon_{ip}$, is the intrinsic peak efficiency of the probe; and
d is the distance from the gamma emission source to the detector.

Figure 4:
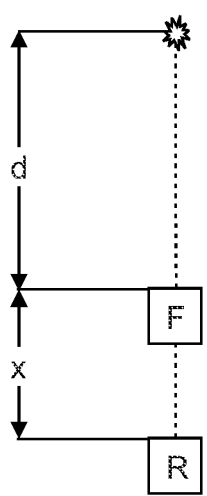
FIG. 4 illustrates the geometry of dual radiation detectors. The value of x is fixed at 1 centimeter for 5 mm cubical CZT detectors. The distance to the target source, d, can vary from about 1 to 6 centimeters in the normal operating range of the probe.

If a second detector is placed at a known distance, x, from the first detector (see FIG. 4), and both are aligned to be co-linear to the radiation source, the number of counts received can be expressed as:

$$N_R = S * \frac{A\epsilon_{ip}}{4\pi(d+x)^2}$$

The ratio of the count rates from the forward and rear detector reduces the equation to:

$$\frac{N_F}{N_R} = \left(\frac{(d+x)}{d}\right)^2$$

Since x is a known distance, this expression can be solved to define d as:

$$d = \frac{x}{\left(\sqrt{\frac{N_F}{N_R}} - 1\right)}.$$

Background and Shielding Compensation

Two software algorithms are used to correct the count rates prior to the depth calculation. Once measured, $N_B$, the background count, is subtracted from both the forward and rear detector count rates, $N_F$ and $N_R$, respectively, leaving the contribution of the target source radiation in the count rate measurements.

The second compensation is a performed by multiplying the count rate of the rear detector by the $K_{SHIELDING}$ factor.

Distance Calculation

The complete mathematical expression for the corrected distance to the source is calculated as:

$$\text{depth} = \frac{x}{\sqrt{\frac{(N_F - N_B)}{((N_R - N_B) * K_{SHIELDING})} - 1}}$$

where, $$K_{SHIELDING} = \left(\frac{1}{\left(1 - e^{-\mu_l T}\right)}\right)$$

and where:
$\mu_l$ is the linear attenuation coefficient for the detector material and the energy of the gamma emission; and
T is the thickness of the front detector material.

The lower end of the energy range for the algorithm is limited to a value to prevent $K_{SHIELDING}$ from exceeding 2.00, which, while an arbitrary value, seems a practical value but could be a different number.

Electronic Collimation

In addition to mathematically estimating the depth of the radioactive source, the dual detector probe can limit the field of view by inhibiting counting whenever the source is outside of the volume specified by a threshold value for count rate ratio, $R_{THRESHOLD}$. This value of the count rate ratio must be exceeded to enable the gamma counts. This method of limiting the field of view has been previously described and incorporated in Chapman, G. J. (2017). "*High Energy Gamma Detection for Minimally Invasive Surgery*", (Doctoral dissertation), The Ohio State University, Columbus, OH, ProQuest Dissertations Publishing, 2019, 27539296. The extent of the field of view for two co-axial detectors is:

$$FOV \text{ Limit} = \frac{x * \left(\cos\varphi + \sqrt{\cos^2\varphi + R_{THRESHOLD} - 1}\right)}{(R_{THRESHOLD} - 1)}$$

where:
x is the fixed distance between the two detectors;

φ is the off-axis angle in the direction of the source; and $R_{THRESHOLD}$ is the value that the count rate ratio must exceed to enable counting.

Figure 5:
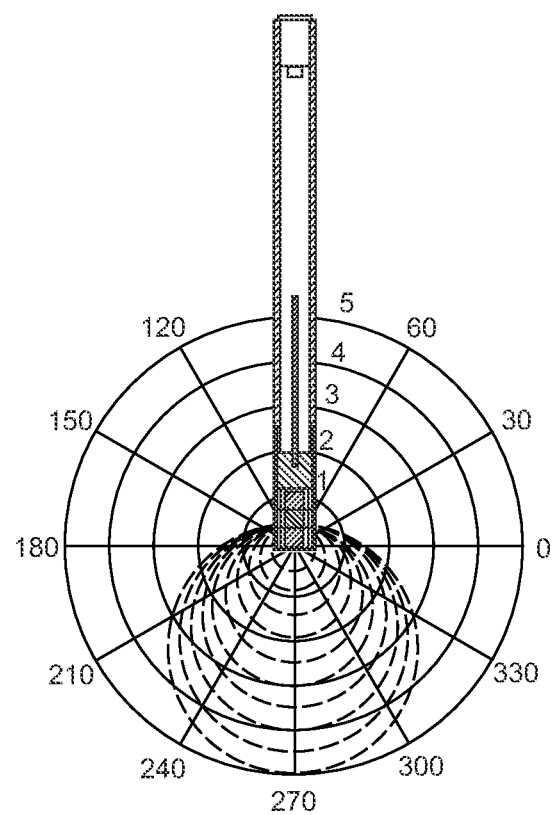
FIG. 5 illustrates the various contours for the electronically collimated field of view at different values of $R_{THRESHOLD}$.

FIG. 5 illustrates the electronically collimated field of view for various values of $R_{THRESHOLD}$.

Alternate Methodology to Measure Depth of the Radiation Source.

Figure 6:
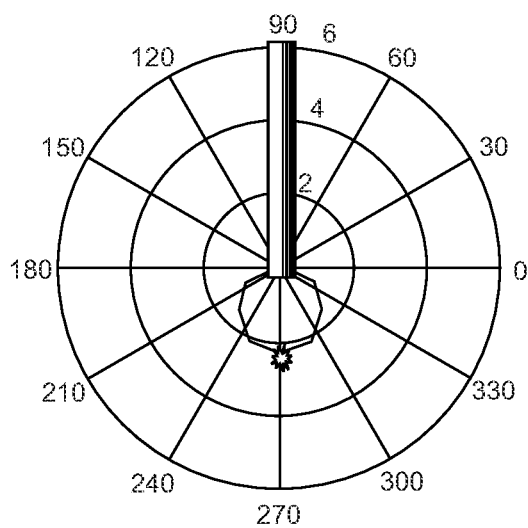
FIGS. 6 and 6A illustrates an alternative methodology to assess depth of a radioactive source. Electronic collimation is used to limit the depth of the field of view until (a) the counts have dropped out. The field of view is then expanded to (b) re-acquire counts. The depth is the limit of the field of view for the current setting of $R_{THRESHOLD}$.
Figure 6A:
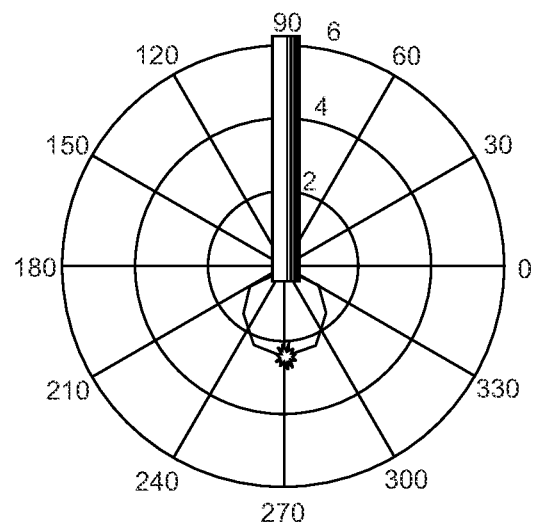

Although the depth of the radiation source can be calculated from the corrected count rate of the two detectors, a methodical approach to the depth measurement can be implemented by reducing the field of view until the count rate from the source drops to a small percentage of the value measured with a large field of view (See FIGS. 6 and 6A). At this point a slight increase in the field of view is made to verify that the radiation source is just at the limit of the field of view. Since the contour of the field of view is defined mathematically at this count rate ratio, the distance to the source is calculated as before, but using the corrected count rates at this ratio setting.

Shielding Compensation

Figure 1:
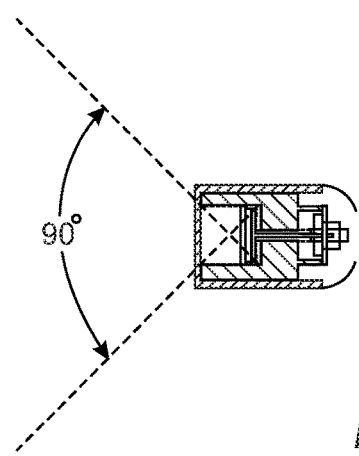
FIG. 1 illustrates a prior art probe with conventional heavy metal shielding that is required to be sufficiently thick to attenuate the greatest energy radionuclide for the intended use of the prior art probe. Attenuation designed into the probe typically is 80%-90% absorption for gamma emissions outside of the field of view.
Figure 2A:
FIG. 2A is an end view of the disclosed two detector probe instrument of FIG. 2.
Figure 2:
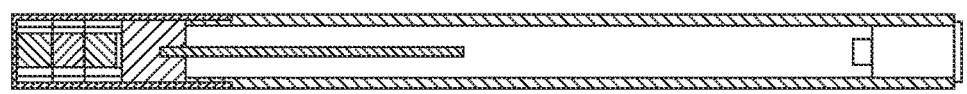
FIG. 2 illustrates the disclosed two detector probe instrument employing cadmium zinc telluride (CdZnTe or CZT) semiconductor detectors. Note the absence of side and rear shielding.

To reduce the size of the probe to a diameter appropriate for laparoscopic use, the detector geometry can be limited to two detectors aligned axially with the field of view in order to implement electronic collimation (See FIG. 2 and end view FIG. 2A). However, this orientation introduces a shielding effect in the resulting loss of gamma counts in the proximal detector must be considered to accurately control the electronic collimation. The percentage of count loss varies with the radionuclide energy, but can be mathematically calculated if the radionuclide is known.

The calculated correction factor ($K_{SHIELDING}$) is a function of the front detector geometry, detector material, and the emission energy of the radionuclide being detected. The correction factor for each radionuclide energy is calculated and pre-set within the control unit software prior to probe activation.

At low energies the $K_{SHIELDING}$ factor can be extremely large since more than half of the radiation does not reach the rear detector due to shielding. Therefore, the $K_{SHIELDING}$ is arbitrarily limited to a maximum value of two (or another value), since it is unrealistic to correct for more than half of the count rate loss due to shielding.

For this reason, the depth calculation cannot be performed using low energy radionuclides. The lowest energy that can be used is also calculated from the thickness and type of the detector material. For a CZT detector of, say, 5 mm thickness (T), radionuclides emitting 234 KeV or lower energies will result in a count loss due to front detector shielding that is greater than 50%, and cannot be used to accurately measure the depth of the target source. At 511 KeV, the same detection crystal results in a 23% loss, making $K_{SHIELDING}$ equal to 1.30. Collimation for low energies can be incorporated in the probe design to augment the use of electronic collimation.

Compensation for Background Count

Figure 3:
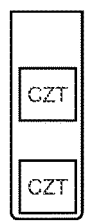
FIG. 3 illustrates the difference in radiation flux for background radiation and localized spherical source. Note that the radiation emissions are diverging, leading to the Inverse Squared Law. Background radiation is directional, but does not diverge.
Figure 3:
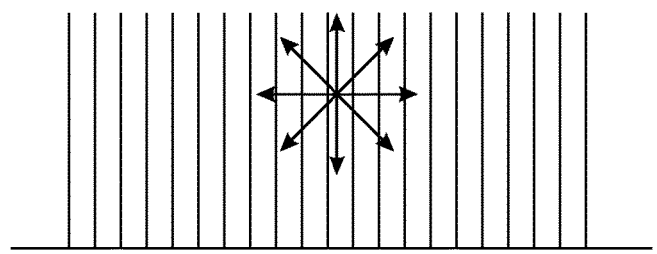

An additional error is introduced from the background radiation counts included in the count rate of both detectors. Since the background radiation is assumed to be uniformly distributed within the volume under measurement, it does not vary according to the Inverse Squared Law (See FIG. 3). It can be assumed that the background count rate does not change significantly over the small distance between the distal and proximal detectors incorporated in the probe. To correct the count rates of both detectors for background counts, a separate measurement of the background radiation must be taken from a site within the surgical field that does not contain target radiation sources, but consist only of tissue emitting a background radiation equivalent to the background radiation at the target source. Once measured, the average background count rate value can be subtracted from the count rates of both detectors.

Once the count rates for the detectors are compensated for both background count and shielding effect, a more accurate estimations of count rate ratio of the two detectors can be used to calculate the depth of the radiation source and limit the field of view for the probe.

Although a previous patent disclosure describes that the distance to the radiation source also can be calculated from the count rate ratio of two detectors, that patent does not address the count rate inaccuracies described herein. This patent provides a mathematical solution to compensate the count rates for shielding effect and background radiation. The methodology described in this work is to be incorporated in the embodiment of an electronically collimated probe consisting of two or more detectors and is an integral part of the probe design.

The Effect of Source Size

Note that the mathematical algorithm associated with depth detection assumes a point radiation source. Because radioactivity is emitted isotropically, the distance to the centroid of any approximately spherical source can. Be calculated using the same algorithm. For large radiolabeled tumors, the depth detection technique disclosed herein will result in the distance to the central location of radioactivity as opposed to the nearest surface of the tumor. For small tumors (say, less than 1 cm) the distance to the center of the tumor and the surface are nearly the same.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. A hand-held probe for detecting a source of radiation, which comprises:
    (a) an elongate annular housing having a forward end and a rear end, and being devoid of side shielding;
    (b) a pair of co-axial radiation detecting elements, a forward co-axial radiation detecting element and a rear co-axial radiation detecting element, the co-axial radiation detecting elements separated by a material of low gamma absorption, the forward co-axial radiation detecting element located at the annular housing forward end and not being recessed;
    (c) one or more preampliers located adjacent and rearward of the pair of co-axial radiation detecting elements and in electrical connection therewith;
    (d) a console in electrical connection with the pair of co-axial radiation detecting elements and housing a software algorithm to determine the distance, d, to a radiation source, according to the following equation:

$$d = \frac{x}{\left(\sqrt{\frac{N_F}{N_R}} - 1\right)}$$

where, $N_F$ is the number of gamma counts received by the forward co-axial radiation detecting element;

$N_R$ is the number of gamma counts received by the rear co-axial radiation detecting element;

d is the distance from the gamma emission source to the detector.

2. The hand-held probe of claim 1, wherein the software algorithm corrects count rates for both co-axial radiation detecting elements by subtracting background radiation count, $N_B$, from both $N_F$ and $N_R$ before determining the distance d.

3. The hand-held probe of claim 2, wherein the software algorithm compensates for shielding by multiplying rear radiation detecting element count rate by the $K_{SHIELDING}$ factor resulting in the software algorithm for a corrected distance, as follows:

$$\text{depth} = \frac{x}{\sqrt{\frac{(N_F - N_B)}{((N_R - N_B) * K_{SHIELDING})}} - 1}$$

where, $$K_{SHIELDING} = \left(\frac{1}{\left(1 - e^{-\mu_l T}\right)}\right);$$

$\mu_l$ is the linear attenuation coefficient for the material of the pair of co-axial radiation detecting elements and the energy of the gamma emission; and T is the thickness of the forward co-axial radiation detecting element.

4. The hand-held probe of claim 3, wherein lower end of the energy range for the software algorithm is limited to the value to prevent $K_{SHIELDING}$ from exceeding 2.00.

5. The hand-held probe of claim 4, wherein the software algorithm calculates the corrected distance to a radiation source, according to the following equations:

$$\text{depth} = \frac{x}{\sqrt{\frac{(N_F - N_B)}{((N_R - N_B) * K_{SHIELDING})}} - 1}$$

where, $$K_{SHIELDING} = \left(\frac{1}{\left(1 - e^{-\mu_l T}\right)}\right)$$

$\mu_l$ is the linear attenuation coefficient for the detector material and the energy of the gamma emission; and T is the thickness of the forward co-axial radiation detecting element.

6. The hand-held probe of claim 5, wherein the software algorithm further limits the field of view by inhibiting counting whenever the radiation source is outside of the volume specified by a threshold value for count rate ratio, $R_{THRESHOLD}$ according to the following equation:

$$\text{FOV Limit} = \frac{x * \left(\cos\varphi + \sqrt{\cos^2\varphi + R_{THRESHOLD} - 1}\right)}{(R_{THRESHOLD} - 1)}$$

where:

x is the fixed distance between the pair of co-axial radiation detecting elements;

φ is the off-axis angle in the direction of the source; and $R_{THRESHOLD}$ is the value that the count rate ratio must exceed to enable counting.

7. The hand-held probe of claim 6, which is calibrated for each specific source of radiation at or above about 511 KeV to provide a correction factor for the shielding effect of the forward co-axial radiation detecting element on the rear co-axial radiation detecting element.

8. The hand-held probe of claim 1, wherein the pair of co-axial radiation detecting elements comprise one or more of a semiconductor, a diode, or a scintillation element.

9. The hand-held probe of claim 1, wherein the diameter of the elongate annular housing is less than about 12 millimeters.

* * * * *